US007647943B2

(12) United States Patent
Kleinert et al.

(10) Patent No.: US 7,647,943 B2
(45) Date of Patent: Jan. 19, 2010

(54) SOLENOID WITH CONTROL CONE

(75) Inventors: Dieter Kleinert, Memmingen (DE); Georg Scherer, Kirchheim (DE); Helmut Mang, Memmingen (DE)

(73) Assignee: Wolfgang E. Schultz, Memmingen (DE)

( * ) Notice: Subject to any disclaimer, the term of this patent is extended or adjusted under 35 U.S.C. 154(b) by 269 days.

(21) Appl. No.: 11/452,308

(22) Filed: Jun. 14, 2006

(65) Prior Publication Data

US 2006/0289822 A1 Dec. 28, 2006

(30) Foreign Application Priority Data

Jun. 15, 2005 (DE) ...................... 10 2005 027 779

(51) Int. Cl.
*F16K 31/04* (2006.01)

(52) U.S. Cl. ........................... 137/625.65; 137/625.26; 251/129.08

(58) Field of Classification Search ............ 137/625.26, 137/625.65; 251/129.08, 129.15, 129.19, 251/322

See application file for complete search history.

(56) References Cited

U.S. PATENT DOCUMENTS

| | | | | |
|---|---|---|---|---|
| 3,018,035 | A | 1/1962 | Pinton | 234/108 |
| 3,737,141 | A * | 6/1973 | Zeuner | 251/129.07 |
| 4,548,233 | A * | 10/1985 | Wolfges | 137/529 |
| 4,886,091 | A * | 12/1989 | Coleman | 137/625.65 |
| 2005/0099256 | A1 | 5/2005 | Subramanian | |

FOREIGN PATENT DOCUMENTS

| | | |
|---|---|---|
| EP | 1507271 | 2/2005 |
| EP | 1522757 | 4/2005 |

* cited by examiner

*Primary Examiner*—Robin O Evans
*Assistant Examiner*—Craig M Schneider
(74) *Attorney, Agent, or Firm*—Jacobson Holman PLLC

(57) ABSTRACT

A solenoid including an armature movable in an armature room, and a coil which can be flowed through by current. When flowed through by current the armature moves. The armature immerses in a control cone. The mean gap width between the armature and the control cone changes with the immersion path of the armature in the control cone.

19 Claims, 3 Drawing Sheets

SOLENOID WITH CONTROL CONE

BACKGROUND OF THE INVENTION

Figure 1:
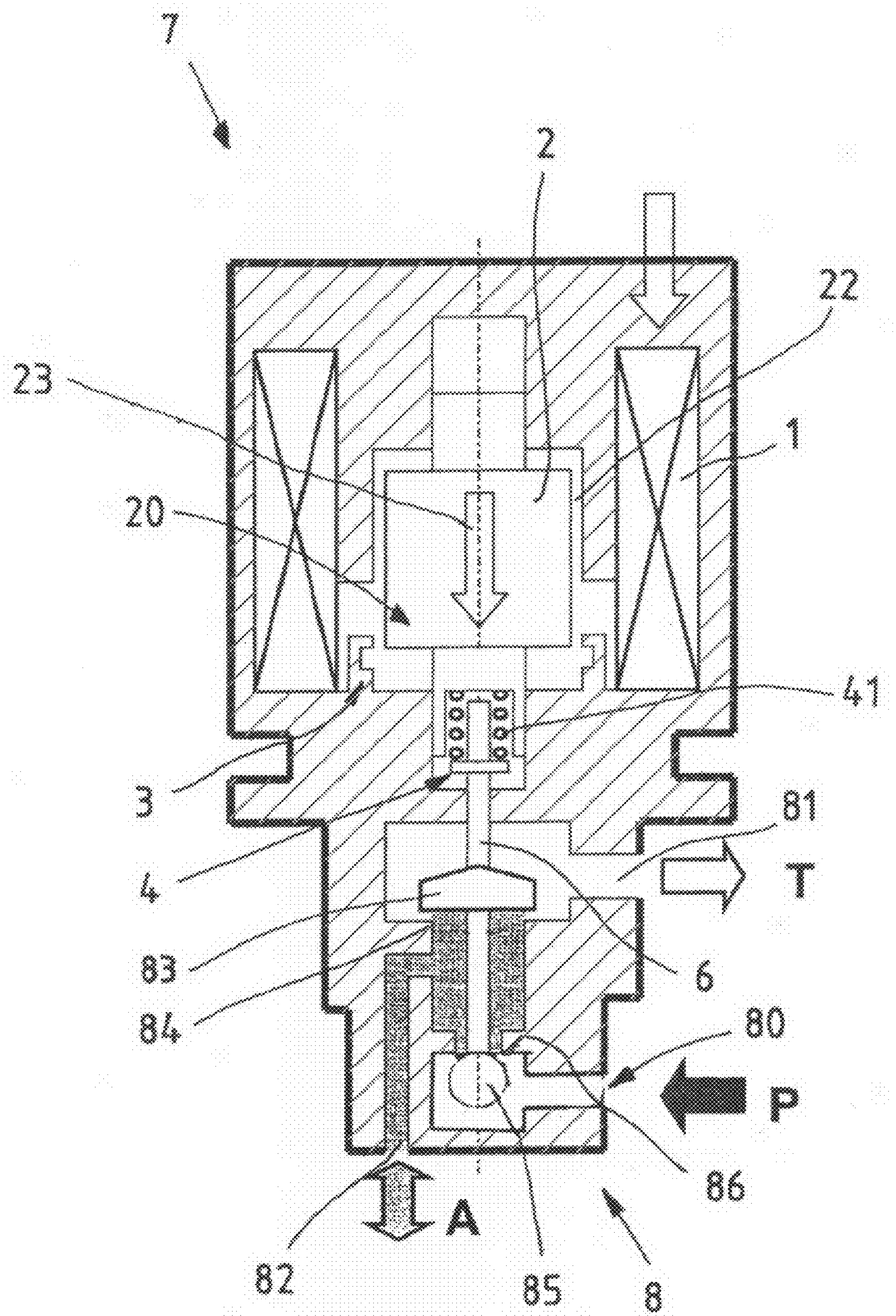

The invention refers to a solenoid comprising an armature movable in an armature room, and a coil which can be flowed through by current, wherein the coil, when flowed through by current, generates a magnetic field which serves for moving the armature so that the armature moves in the direction of the control cone, respectively the front region of the armature immerses in the control cone.

Solenoids of the type described in the beginning are sufficiently known. They serve for carrying out corresponding switch or control tasks.

Here, for example, proportional magnets are known where a power is generated by means of the solenoid which is proportional to the applied current. Linear connections of this kind can, for example, be used in suitable pressure control valves where a corresponding linear pressure control characteristic is decisive.

Known pressure control valves have here the object of reacting as sensitively and delicately as possible in a control range as large as possible. Just in the lower characteristics region the inclination of the characteristic is supposed to be not too steep so that too large variations do not result from slight current variations. On the other hand, however, suitable pressure control valves should provide, even with high pressure, a high control power. Here the electric requirements should remain unchanged, if possible, that means that the large development of power is not supposed to lead to a higher receiving of current, and thus necessarily to a larger diameter of the wire in the coils.

In order to be used optimally in such a case of application a solenoid is supposed to have a characteristic deviating from the linear control characteristic.

BRIEF SUMMARY OF THE INVENTION

It is therefore an object of the invention to provide a solenoid which has a not-linear characteristic, in particular a progressive characteristic.

In order to solve this problem the invention comes from a solenoid as described in the beginning, and suggests that the mean gap width between the armature and the control cone changes together with the way of immersion of the armature in the control cone.

A progressive characteristic is the fact that the relation between current and the power resulting from the solenoid is not linear but is of a higher degree. That means that with relatively low current a change of current leads only to a small change of power, in contrast to that the same change of current causes, with high current, clearly higher changes of power. As because of the use of the solenoid, for example in pressure control valves, the power generated by the solenoid controls sealing elements, the result is here also a correspondingly progressive course of the characteristic of the pressure current. According to the invention it is suggested to design the width of the gap between armature and control cone in such a way that, together with the immersion way of the armature in the control cone the gap width changes. The development of power of a solenoid depends in particular on the density of the magnetic field lines of the armature to the core. The development of power of a solenoid is increased, for example, if in the armature a corresponding small air gap is provided. This knowledge is now used in order to reach a characteristic deviating from the linear control characteristic (this can be the power depending on the current, or the pressure depending on the current). Thus, for example, according to the invention first of all it is suggested to offer as a result a relatively small gap which then spreads accordingly.

In this connection the mean gap width is understood in such a way that along the immersion way of the armature in the control cone the gap width is determined in infinitesimal steps, and the sum resulting from that or the integral, respectively, is divided through the immersion way.

In this connection the term control cone cannot be interpreted, either, limiting as cone-like, that means for example frustum-like. A control cone is basically each geometric arrangement of the interior surfaces of the core of the magnet which interacts with the armature. Besides a cone-like design, that is, for example, a frustum-like design, it is, of course, also possible that a cylindrical or pot-like design is realised. Of course, also suitable intermediate forms are possible to reach the object of the invention where suitable sections of different kind can be combined with each other.

Thus, for example, it is suggested in a modification according to the invention that the control cone and/or the armature has/have interior surfaces or surface areas, respectively, which are orientated at least partly parallel to the direction of movement of the armature. The control cone has, according to this modification of the invention, suitable interior surfaces, the armature has suitable surface areas. The principle according to the invention is here not restricted only to a special design of the control cone, but it can, according to the principle of the kinematic reversal, be realised in the same way also in the armature. In this respect, for example, also armature designs are part of the invention which deviate from the known cylindrical designs, and have, for example, suitable collars, flanges, rings or cone-like inclinations and so on.

In another modification according to the invention it is suggested that in the first phase of immersion of the armature, first of all, a small mean gap width results which increases when the armature immerses further in the control cone.

A modification of the arrangement according to the invention is here designed in such a way that roughly three different phases result. In the first phase the armature, respectively its front armature region, immerses in the control cone. The immersion way is here assumed to be the length of the armature which is counted from the edge of the control cone to the front end of the armature. The interaction of the immersing armature with the control cone here causes already a corresponding effect in the characteristic. The second phase is characterised by the fact that then the gap (seen in the longitudinal direction of the movement) increases. The third phase or final phase is given by the fact that the armature is moved completely in the control cone, and is in contact with the bottom of the cone.

In the first phase of the immersion of the armature, according to the modification suggested by the invention, first of all a small mean gap width occurs that means a relatively high concentration of magnetic field lines (the air gap is relatively small). When the armature immerses further in the control cone the front region of the armature is further removed from the interior surface of the control cone, the occurring gap is correspondingly larger. The density of the magnetic field is in the front armature region not so large anymore as during immersion. This effect, however, is added to the already existing effect of the narrow gap region, but it is reduced. The result is a non-linear behaviour of the characteristic.

In order to develop a suitable large power in the final holding position of the attracted solenoids, according to the invention it is suggested that during the last phase of immersion of the armature in the control cone the mean gap width is reduced. During the last phase of immersion of the armature the front region of the armature reaches a position with respect to the control cone where again a narrower gap occurs between the armature and the control cone. This region is, for example, designed as shoulder, inclination, cone or the like.

According to the invention it is, in particular suggested for that that the interior surface of the control cone and/or the surface area of the armature has projections and shoulders, respectively. According to the invention thus at least three modifications are suggested. In the first modification the interior surface of the control cone is equipped with projections and shoulders, respectively, in order to change by means of that the width of the gap. This can be carried out, for example, by providing suitable circular grooves (they can be on the completely circumference or only on a part of the circumference). The design of the geometry can vary accordingly in order to influence the characteristic accordingly. In the second modification it is provided that also the surface area of the armature has corresponding projections or shoulders so that it is here in particular the region of the armature which actually immerses in the control cone as here the density of the magnetic field lines is the largest and thus also the most decisive one.

The accordingly equipped interior surface of the control cone or an accordingly equipped surface area of the armature interacts here, for example, with a corresponding cylindrical design of the opposite surface, that is, in the case of the control cone, a cylindrical surface area of the armature or a cylindrical interior surface with an armature accordingly equipped with shoulders and projections. Besides it is, of course, also possible to design the interior surface of the control cone as well as the surface area of the armature with suitable shoulders or projections, or rather also with section-wise conical or frustum-like regions, on the complete circumference or only on a part circumference. All these modifications (in particular with respect to the design of the projections or shoulders) are part of the invention.

These modifications suggested according to the invention have the effect that the width of the gap can vary each time, and, in particular by means of that, also a mean gap width which can vary with the immersion way of the armature occurs.

In a preferred embodiment of the invention it is provided that the control cone has on its end facing the armature a flange pointing inwards. By means of this inwards-pointing flange it is possible, in a simple manner, to realise a relatively small gap between the control cone and the armature.

In another modification according to the invention it is suggested that the interior surface of the control cone recedes compared with the flange. This interior surface is, for example, also designed as cylinder surface and thus orientated parallel to the direction of movement of the armature. However, it is also possible that section-wise, if necessary even opposing, cone-like surfaces are provided. Also ring-shaped surfaces or other bent surfaces are comprised by the invention.

In the control cone at the end opposite the armature a pot-like cone bottom is provided. To this cone bottom the interior surface which recedes compared with the flange is possibly joined either directly or a suitable collar or shoulder is provided. Depending on the design of this shoulder it is again possible to vary and optimise, respectively, the development of power of the solenoid when the armature is accordingly immersed. Also the design of the cone bottom, which is produced, for example, by a cutting machining, is free. It is possible to design the cone bottom cylinder-like so that, for example, between the edge and the bottom surface there is a right angle, or that this region is designed like a cone or a frustum. In this connection the cone bottom is not restricted only to rectangular surface concluding the control cone, rectangular to the direction of movement, but it even describes additionally an axial region. Of course, the cone bottom also comprises the concluding surface, and it can be accordingly interpreted.

The result is that by choosing the interior diameter of the bottom of the cone and the flange the features of the solenoid can be adjusted accordingly. Thus it is, according to the invention, suggested that the interior diameter of the bottom of the cone and the flange are identical or different. An identical diameter makes machining easier as, for example, it is done by a single cutting machining process by which the interior surface of the flange and the interior surface of the bottom of the cone are machined. However, the invention is not determined in this respect, these two interior diameters can also be different, the diameter of the bottom of the cone being larger or smaller than the interior diameter of the flange. The result here is different features in the characteristic in each case.

In a modification according to the invention it is suggested that the armature carries on its side facing the control cone an absorbing disc, in particular from non-magnetizable material. By means of the absorbing disc, on the one hand, the mechanic stress of the armature is reduced when it hits accordingly the bottom of the cone, and, on the other hand, also a resulting air gap will remain in the attracted position so that large adhesion powers do not occur which, in current-less condition, would make a restoring movement of the armature (for example because of springs or the like) more difficult or impossible.

It is convenient that in a modification according to the invention it is provided that the front end of the armature forms a control edge, the control edge interacts in the first phase of immersion with the flange of the control cone and in the last phase with the edge or the shoulder of the cone bottom. The control edge thus defines the immersion way of the armature in the control cone, in particular when the control edge is the foremost region or edge of the armature in the direction of movement of the armature. Cleverly the edge also limits simultaneously the gap between the armature and the control cone.

Advantageously it is provided that the depth of the cone bottom is at least the thickness of the absorbing disc. In modifications according to the invention it is, for example, provided that the cone bottom is defined by a shoulder or a projection at the otherwise receding interior surface of the control cone. The narrower gap resulting from that between the control cone and the armature is desired, and leads to an accordingly higher development of power of the magnet. In order to use this effect optimal the dimensions of the depth of the cone bottom and the thickness of the absorbing disc are adjusted to each other as indicated, in such a way that the control edge of the armature can interact with the shoulder at the beginning of the cone bottom in a suitable desired way.

As described the invention comprises several embodiments. Besides a corresponding modification in the embodiment of the control cone, the invention comprises also a modification where the armature is designed in a suitable way. At this point it is, of course, pointed out again that the invention also expressedly comprises a combination of these two modifications.

In another preferred modification of the invention it is therefore suggested that the armature has in its front region immersing in the control cone a circumferential groove. This modification as well as the presented modification is shown in the drawing. By means of the circumferential groove a region is created which has a larger distance with respect to the interior surface of the control cone, the gap is larger here. During the immersion of such an armature in the control cone (with or without flange) thus a change of the mean gap width results depending on the immersion way.

Such a modification according to the invention has the result that the armature has a first front control edge, and the back region of the groove has a second back control edge. By means of the position of the groove thus the front region, that is the thickness of the first armature region joining the control edge, is set accordingly. At the same time the back region of the groove, in the direction of movement of the armature, another control edge is defined which interacts during the immersion of the complete groove in the control cone with the top edge of the control cone in a similar way as the first control edge. Of course, the invention comprises here also again modifications where the diameter of the armature in the region of the first control edge and the second control edge is either identical or different. By a suitable dimensioning a number of correcting variables are offered in order to realise corresponding desired effects in a progressive characteristic.

According to the invention it is provided here that the two control edges each interact with the front edge of the control cone. The control cone can here be, for example, cylindrically or, as described above, also be equipped with a hook-like flange projecting inward.

The movement of the armature is, for example, transmitted by an armature bar to a suitable element which can be adjusted or controlled. Thus the armature acts together with the armature bar, so that a rigid connection between the armature and the armature bar as well as a loose connection is possible according to the invention.

In a preferred modification according to the invention it is provided that between the armature and the armature bar a path converter is arranged. A path converter is designed, for example, like a gear, and has the effect of a simultaneous change of power and a conversion of power, respectively, or it is, for example, realised by springs, and changes only the stroke of the armature into a smaller stroke of the armature bar. At this point it is referred to the full content of another application by the same applicant which describes in particular the path converter, which has been filed today, simultaneously with this application. The disclosure of this application with the title "Solenoid with Path Converter" is referred to at this point to the full extent.

By means of the arrangement of the path converter according to the invention it is, in particular, achieved that a relatively large stroke of the armature is transformed in a smaller stroke of the armature bar and an element controlled by the armature bar, this being carried out, if necessary, with or without conversion of power.

It is, in particular, provided that the armature bar acts on at least one sealing element of the valve. The sealing element interacts here with a seal receiver of the valve, and is pushed in or out of the seal receiver by the armature bar. The invention becomes in particular more important with suitable pressure control valves, as by means of that, when the pressure is accordingly low, it can be adjusted sensitively by means of the design according to the invention, and because of a progressive course of the characteristic then in the closing position a corresponding large power and a high pressure, respectively, is available when the current changes identically.

The invention comprises here also a pressure control valve which comprises a solenoid, as described, and a valve connected with the solenoid, wherein the armature bar controls a sealing body closing a seal receiver, and the position of the armature controls the position of the sealing body, and the armature bar acts furthermore on a second sealing body which closes in current-less condition of the solenoid a second seal receiver, wherein in the first phase of immersion of the armature in the control cone the armature bar pushes out the second sealing body of the second seal receiver. By means of the arrangement of the hook-like flange and the circular groove, respectively, at the armature, it is achieved that the development of power of the magnet is increased, just when the armature immerses in the control cone, namely in such a way that the second sealing body is pushed or shoved out of the second seal receiver. This second sealing body is designed, for example, ball-like and orientated loosely to the armature bar, wherein the pressure in the pressure circle in current-less condition of the solenoid effects that this second sealing body is in the second seal receiver and thus seals the valve reliably. The design of the geometry according to the invention of the control cone and/or the armature (e.g. via the hook shape and the circle collar shape, respectively) has the effect that the magnet power characteristic is lifted in the second phase, where the second sealing body has to be opened, so far that an early start of the control is possible. This is a considerable additional advantage of the invention.

BRIEF DESCRIPTION OF THE DIFFERENT VIEWS AND DRAWINGS

Figure 2A:
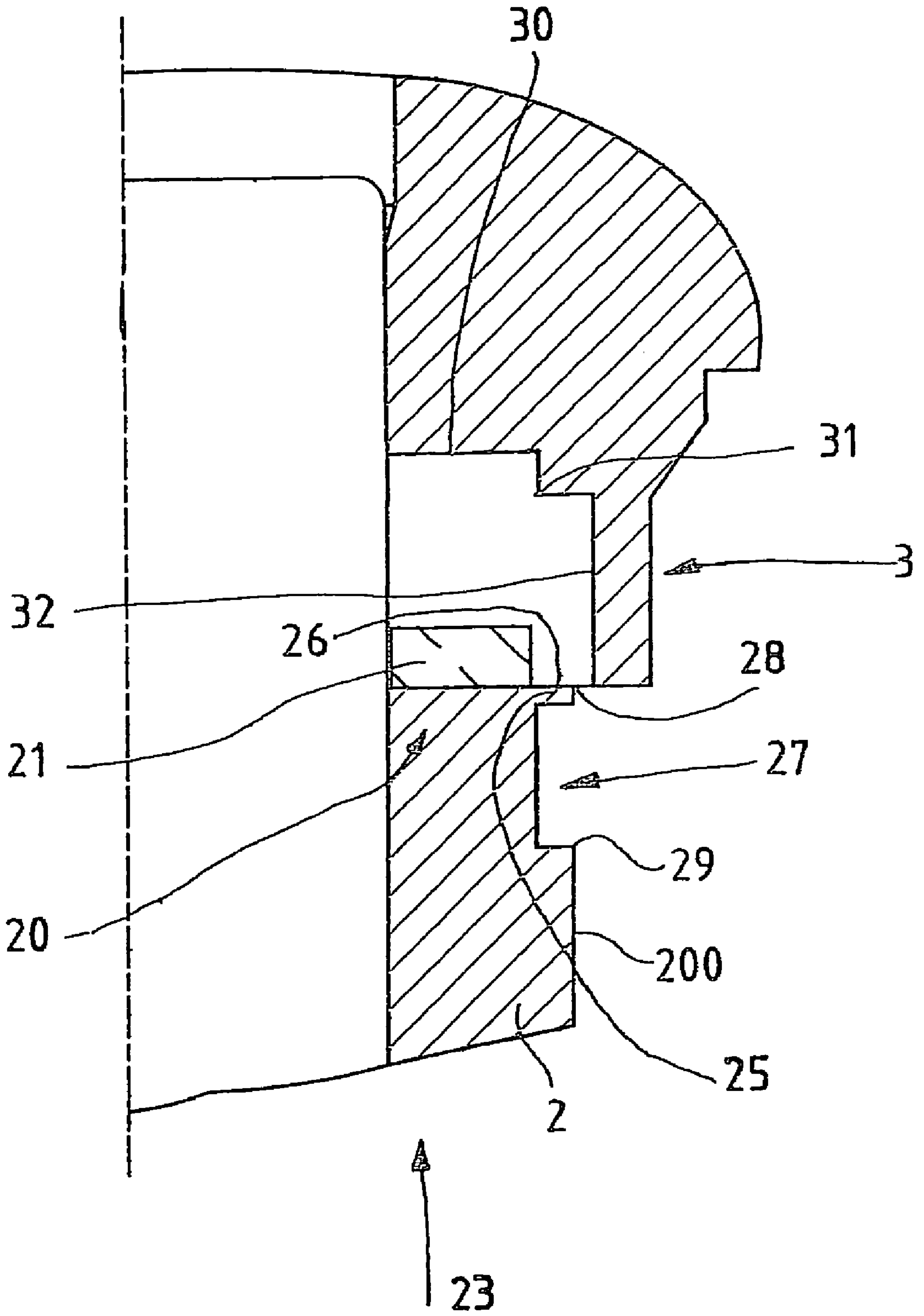
Figure 2B:
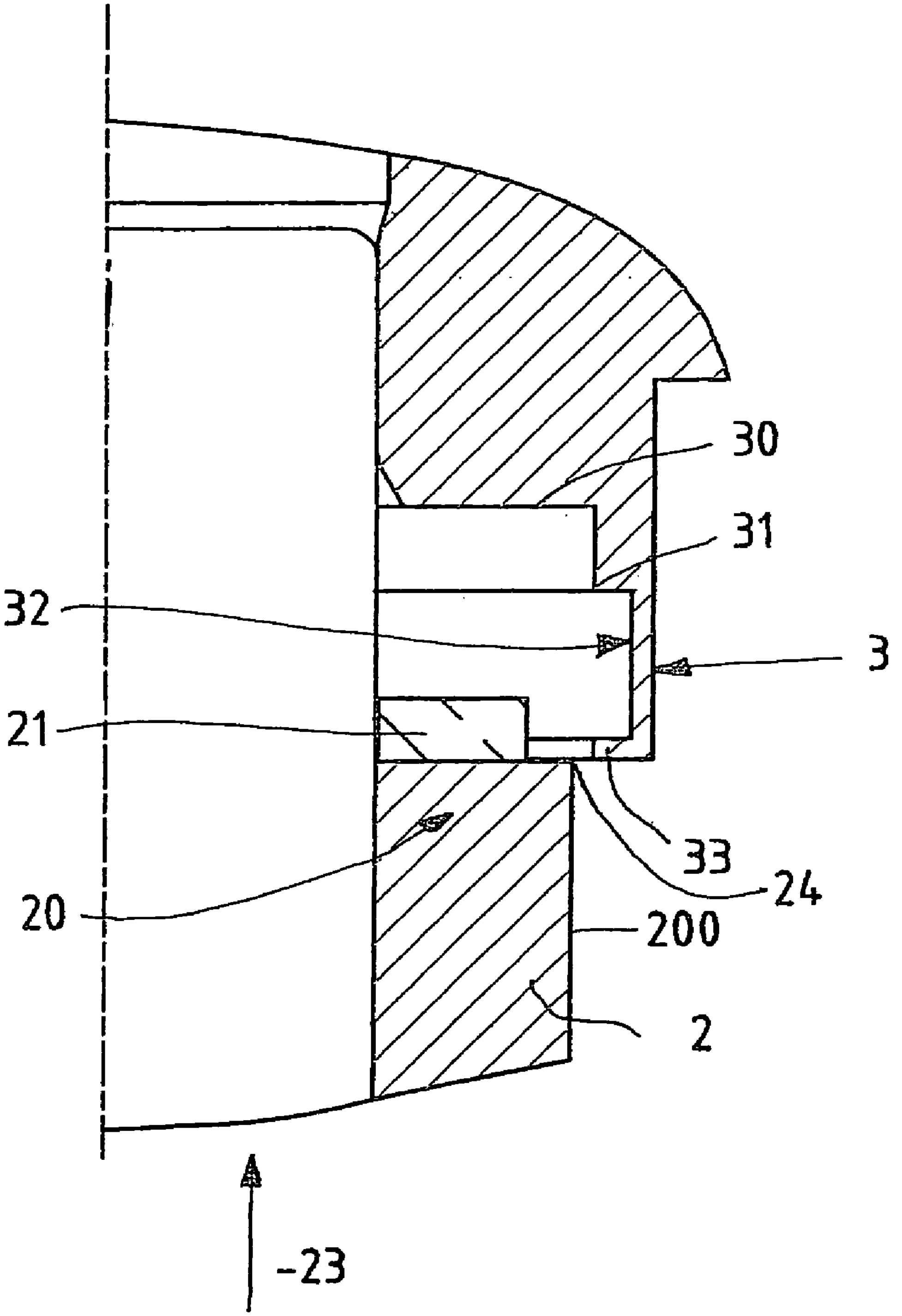

The invention is shown schematically in the drawings. In the drawings:

FIG. 1 a schematic view of the solenoid according to the invention and the pressure valve according to the invention, respectively, and FIGS. 2*a*, 2*b* different details of the solenoid according to the invention in a sectional view.

DETAILED DESCRIPTION OF THE PREFERRED EMBODIMENT

The solenoid 7 according to the invention can be seen in particular in FIG. 1. The solenoid 7 comprises an armature 2 movable in the armature room 22. The armature room 22 is surrounded by the coil 1. When flowed through by current, the coil 1 generates a magnetic field which effects that the armature 2 is moved downward (arrow 23).

In the view shown in FIG. 1 in the bottom region of the armature room 22 there is the control cone 3. When flowed through by current the armature 2 moves into the control cone 3, the special design of the control cone 3 leading to a progressive course of the characteristic.

The example shown in FIG. 1 shows a valve 8 driven by the solenoid 7 called for example pressure control valve. For that purpose the armature 2 acts on an armature bar 6 which joins below the armature 2 outside the armature room 22.

In the example shown here a path converter 4 is arranged between the armature 2 and the armature bar 6. The path converter 4 effects a transformation of the stroke carried out by the armature 2. That means that the stroke 2 of the armature 2 is not transmitted to the same extent to the armature bar 6, but to a correspondingly reduced extent. As shown here, one or more springs 41 of the path converter 4 are compressed wherein in this embodiment a reduction of the path or the stroke is carried out without conversion of power.

Of course, also a path conversion with an according transformation of stroke, for example in a gear or a lever mechanics, is possible. By means of such an arrangement it is, for example, achieved that a relatively large stroke of the armature 2 not necessary for the desired use is limited or restricted to a suitable stroke dimension. Also an enlargement of the stroke (as kinematic reversal) by the path converter 4 is part of the invention.

Below the path converter 4, as described, the armature bar 6 is joined. The armature bar 6 is thus movable relatively to the armature 2, the path converter 4 as a suitable receptacle or joining arrangement for the armature 2, on the one hand, as well as for the armature bar 6, on the other hand.

The shown application as pressure control valve is, for example, used with according hydraulic circuits. The operational pressure of the hydraulic is the pressure P at the inlet 80. The inlet 80 is here part of the valve 8 which is joined below the solenoid 7.

The bottom end of the armature bar 6 acts here on a second sealing element 85 which is designed, for example, as ball. In current-less condition the armature 2 is shifted completely upward, the front region 20 of the armature 2 does not immerse in the control cone. Because of the operational pressure P the second, ball-like sealing element 85 is pushed in the second seal receiver 86. Thus the valve is sealed reliably. When a certain amount of current flows through the armature 2 is shifted downward, the armature bar 6 follows with the same or according to the transformation relation of the path converter 4 this movement, and pushes the second sealing element 85 out of the seal receiver. At the same time the first sealing element 83 arranged fixedly on the armature bar 6 moves in the direction of the first seal receiver 84 and reduces the passage still shown here. By means of the control characteristic of the solenoid now here a corresponding control of the pressure at the control outlet 81 is carried out. Via the second outlet 82 a removal of the superfluous hydraulic fluid is carried out. The arrangement is here chosen in such a way that, when the solenoid is completely flowed through by current, the magnetic field of coil 1 pulls the armature 2 completely in the control cone 3 and thus pushes the first sealing element 83 strongly, with high development of power, in the first seal receiver 84. The arrangement is dimensioned here such that it is secured that the power generated by the solenoid is reliably sufficient to hold the sealing element 83 against a certain operational pressure P reliably in the first seal receiver 84. This is achieved by an accordingly progressive characteristic, wherein with a corresponding small change of current and absolute high current a large change of power (with a pressure control application a large change of pressure) results.

In FIG. 2*b* and FIG. 2*a*, respectively, two different modifications of the solenoid according to the invention are shown. The arrangement is here chosen each time in such a way that a progressive control characteristic occurs. Basically it is possible also to combine the embodiments shown in FIG. 2*a* and FIG. 2*b*, respectively, with one another.

FIG. 2*a* and FIG. 2*b*, respectively, show in a considerably enlarged detail the (first) phase of immersion of the armature 2 in the control cone 3. The armature 2 is here connected with an armature bar 6, wherein this is part of the invention as well as a loose connection or a connection carried out by a path converter 4 (see FIG. 1). It is, of course, possible that also the armature bar 6, above the modification shown in FIG. 2*a* and FIG. 2*b*, respectively, is joined by a path converter, and after that another armature bar follows.

The armature 2 carries an absorption disc 21 on its end facing the control cone 3. When fully flowed through by current thus the armature 2 does not hit the bottom 30 of the cone hard, but it is absorbed accordingly by this absorption disc 21.

In the position shown here the immersion of the armature 2 in the control cone 3 is just starting. The control edge 24 at the front end of the armature 2, in the front region 20, is here in a line with the bottom edge of the control cone 3, wherein the control cone 3 has here a flange 33 projecting inward. Already here a considerable densification of the magnetic field lines occurs. Thus with small current already a sufficient power of the solenoid is available that for example the second sealing element 85 is freed securely from its seal receiver 86.

When further flowed through by current the armature moves further upward (arrow 23), the control edge 24 gets behind (in the direction of movement 23) the flange 33 where a receded interior surface 32 is joined in the control cone 3. The gap between the flange 33 and the armature 2, here designed as homogenous cylinder, is relatively narrow or small, in the region of the interior surface 32 the width of the gap is clearly larger because of the receded arrangement of the interior surface 32. This means with respect to the development of power that with the further immersion not the same dimension of focusing of the magnetic field lines is carried out as in the first phase, the development of power per way length is thus not so large any more, the reaction behaviour of the control characteristic is thus relatively flattened. At the end of this second phase the control edge 24 reaches the shoulder 31 which separates the bottom 30 of the cone from the cylindrical interior surfaces 32. Thus now again a considerable densification of the magnetic field lines, similar to the immersion of the armature 2 in the control cone 3, occurs which is coupled with an accordingly higher, relative development of power of the magnet. In the pressure control valve suggested according to the invention in this position fully flowed through by current, for example, the first sealing element 83 is held securely in the first seal receiver 84 so that the high development.

The thickness of the absorbing disc 21 is here dimensioned in such a way that the control edge 24 interacts reliably with the shoulder 31. The thickness of the absorbing disc 21 is less than the depth of the pot-like bottom 30 of the cone. In the following it will be remarked that the bottom 30 of the cone is not only the bottom surface orientated rectangular to the direction of the movement 23, but also describes the region described parallel to it beginning with the shoulder 31.

In FIG. 2*a* another concept which also leads to the solution according to the invention is shown.

In FIG. 2*b* an essentially cylindrical armature 2 (with cylindrical surface area 200), was combined with a control cone 3 having an undercut and a flange 33, respectively.

In FIG. 2*a* the control cone 3 is designed in full length as a cylinder without corresponding hook or flange. For that at the armature 2 in the front region 20 a circular groove 27 is arranged which starts beginning with a certain thickness from the front armature surface 26. By means of this thickness of the ring 25 also features of the solenoid can be set with reference to its characteristic. At the front edge of the ring 25 there is a first control edge 28, at the back end (with reference to the direction of movement 23) of the circular groove 27 there is a second control edge 29.

The desired course of the characteristic here also is carried out by a clever interaction of the first control edge 28 and the second control edge 29. Here also a position is shown where the armature 2 just immerses in the control cone 3, that means a relatively small gap is available. The mean gap width is also small. In the second phase then the circular groove region 27 gets in the control cone, the distance between the armature and the interior surface 32 of the control cone increases, the mean gap width, with reference to the immersion way of the armature 2 in the control cone 3 changes or becomes larger, respectively. The effect remains until the second control edge 29 enters the control cone 3 because then the shoulder which is forming again leads to a densification of the magnetic field lines and thus the development of power increases. This occurs together with a clear reduction of the gap width in the region of the second control edge 29 which also leads to a corresponding reduction of the mean gap width with this immersion way.

Analogous facts also go for the example according to FIG. 2*b*.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. Solenoid comprising an armature movable in an armature room and a coil which can be flowed through by current, the coil generating, when flowed through by current, a magnetic field serving for movement of the armature so that the armature moves toward a direction of a control cone so that a front region of the armature immerses into the control cone, a width of a gap between the armature and the control cone changing with a diving distance of the armature into the control cone from a first gap width between a leading control edge of the armature and a leading control surface of the control cone, with a subsequent second increased gap width between an interior surface of the control cone and an exterior surface of the armature, and in a last phase of immersion of the armature into the control cone a third width of a gap between a trailing control surface of the armature and the leading control surface of the control cone decreases to approaching the first width gap.

2. Solenoid according to claim 1, wherein at least one of the control cone and the armature have an interior surface which is orientated at least partially parallel to a direction of movement of the armature.

3. Solenoid according to claim 1, wherein at least one of in a first phase of the immersion of the armature the mean width of the gap increases when the armature immerses further into the control cone.

4. Solenoid according to claim 1, wherein at least one of the control cone and the armature have an interior surface which is orientated at least partially parallel to a direction of movement of the armature, and the surface area of the at least one of the control cone and the surface area of the armature have shoulders.

5. Solenoid according to claim 1, wherein the control cone has on an end facing the armature a flange pointing inside.

6. Solenoid according to claim 5, wherein at least one of the control cone and the armature have an interior surface which is orientated at least partially parallel to a direction of movement of the armature, the control cone has on an end facing the armature and a flange pointing inside, and the interior surface of the control cone recedes compared with the flange.

7. Solenoid according to claim 1, wherein in the control cone at an end opposite the armature a cone bottom is provided.

8. Solenoid according to claim 1, wherein in the control cone at an end opposite the armature a cone bottom is provided, an interior diameter of the cone bottom and of the flange are identical.

9. Solenoid according to claim 1, wherein the armature has a front end, and the front end of the armature forms a control edge, and the control edge interacts in a first phase of the diving with a flange provided at the control cone, and in a last phase with a shoulder of a cone bottom provided at the control cone.

10. Solenoid according to claim 1, wherein the armature has in a front armature region immersing into the control cone a circumferential groove.

11. Solenoid according to claim 1, wherein the armature has in a front armature region immersing into the control cone a circumferential groove, and the armature has a first front control edge, and in a back region of the groove a second back control edge is provided.

12. Solenoid according to claim 1, wherein the armature has in a front armature region immersing into the control cone a circumferential groove, and the armature has a first front control edge, and in a back region of the groove a second back control edge is provided, and each of the two control edges interact with a front edge of the control cone.

13. Solenoid according to claim 1, wherein the armature has in a front armature region immersing into the control cone a circumferential groove, and the armature has a first front control edge, and in a back region of the groove a second back control edge is provided, and the first control edge interacts with a cone bottom provided at a bottom of at least one of the control cone and a shoulder arranged at the cone bottom.

14. Solenoid according to claim 1, wherein the armature interacts with an armature bar.

15. Solenoid according to claim 1, wherein the armature interacts with an armature bar, and between the armature and the armature bar a path converter is provided.

16. Solenoid according to claim 1, wherein the armature interacts with an armature bar, and the armature bar acts on at least one seal element of a valve.

17. Solenoid comprising an armature movable in an armature room and a coil which can be flowed through by current, the coil generating, when flowed through by current, a magnetic field serving for movement of the armature so that the armature moves toward a direction of a control cone so that a front region of the armature immerses into the control cone, a mean width of a gap between the armature and the control cone changing with a diving distance of the armature into the control cone and in a last phase of immersion of the armature into the control cone the mean width of the gap decreases, the armature carrying on a side facing the control cone an absorbing disc made from a non-magnetizable material.

18. Solenoid comprising an armature movable in an armature room and a coil which can be flowed through by current, the coil generating, when flowed through by current, a magnetic field serving for movement of the armature so that the armature moves toward a direction of a control cone so that a front region of the armature immerses into the control cone, a mean width of a gap between the armature and the control cone changing with a diving distance of the armature into the control cone and in a last phase of immersion of the armature into the control cone the mean width of the gap decreases, the armature carrying on a side facing the control cone an absorbing disc, made from non-magnetizable material, and in the control cone at an end opposite to the armature a cone bottom is provided, and a depth of the cone bottom being at least a thickness of the absorbing disc.

19. Pressure control valve comprising a solenoid according to claim 1 and a valve connected with the solenoid, wherein the armature bar carries a seal body which also closes a seal receiver, and a position of the armature controls a position of the seal body with reference to the seal receiver, and the armature bar furthermore acts on a second seal body which closes in a currentless condition of the solenoid, a second seal receiver, wherein in a first phase of immersion of the armature into the control cone the armature bar pushes the second seal body out of the second seal receiver.

* * * * *

UNITED STATES PATENT AND TRADEMARK OFFICE

CERTIFICATE OF CORRECTION

PATENT NO. : 7,647,943 B2
APPLICATION NO. : 11/452308
DATED : January 19, 2010
INVENTOR(S) : Kleinert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this

Sixteenth Day of November, 2010

David J. Kappos

*Director of the United States Patent and Trademark Office*